May 31, 1927.
H RUZICKA
1,630,970
BRAKING DEVICE FOR SLEDS
Filed Jan. 2, 1925
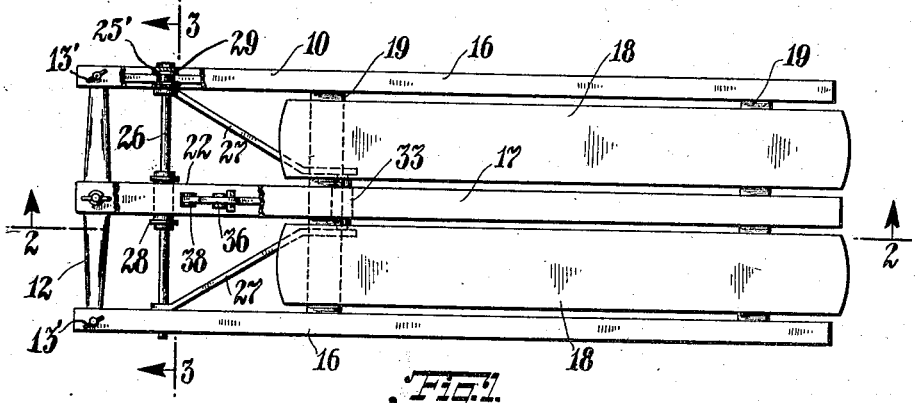
Fig. 1.
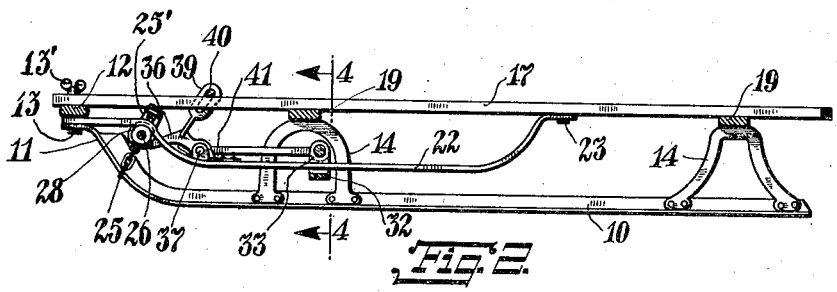
Fig. 2.
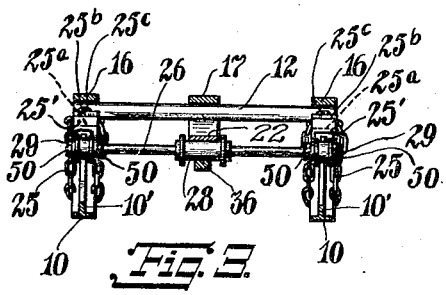
Fig. 3.
Fig. 4.
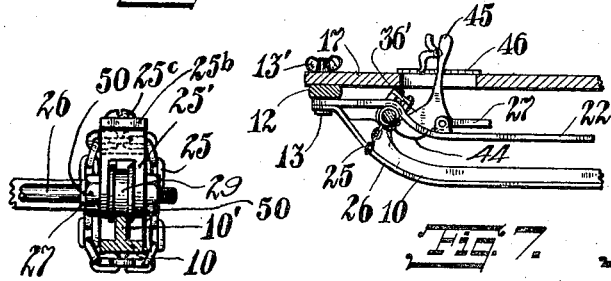
Fig. 5.   Fig. 7.
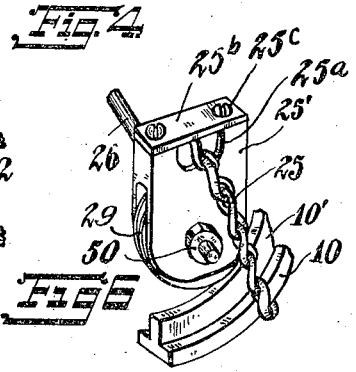
Fig. 6.
INVENTOR
Henry Ruzicka
BY
ATTORNEY Patented May 31, 1927.

1,630,970

UNITED STATES PATENT OFFICE.

HENRY RUZICKA, OF NEW YORK, N. Y.

BRAKING DEVICE FOR SLEDS.

Application filed January 2, 1925. Serial No. 5.

This invention relates to a braking or skid device for sleds which may be applied to a small sled such as is used by children in coasting, or which may be applied to a horse drawn sled for use as a skid or brake in going down hill.

The invention has for an object the provision of a novel and simple brake or skid device, that will serve to quickly bring the sled to a stop when applied to a small child's sled, or which may serve as an adequate brake or skid when applied to a large sled.

For further comprehension of the invention, and of the objects and advantages thereof, reference will be had to the following description and accompanying drawing, and to the appended claims in which the various novel features of the invention are more particularly set forth.

Fig. 1 of the drawing is a plan view, with parts broken away, showing a sled having my improved braking device applied thereto.

Fig. 2 is a longitudinal sectional view taken on the line 2—2 of Fig. 1.

Fig. 3 is a transverse sectional view taken on the line 3—3 of Fig. 1.

Fig. 4 is a fragmentary transverse sectional view taken on the line 4—4 of Fig. 2.

Fig. 5 is an enlarged fragmentary transverse sectional view taken on the same line as Fig. 3.

Fig. 6 is a detail perspective view showing the means for mounting the braking chains.

Fig. 7 is a fragmentary longitudinal sectional view showing a slightly modified construction.

The sled to which my invention is here applied comprises a pair of runners 10 that are of T-shape in cross section to present upstanding flanges 10' extending the length thereof, these runners being curved upwardly at the front end as at 11 to connect to the front crossbar 12 of the sled, being secured to the latter by bolts 13 on which are wing nuts 13'. Fixed to the runners 10, at suitable points along the length of the latter, are ordinary arched brackets 14 that support the top part, or platform, of the sled. This top part comprises a pair of side bars 16 and a central bar 17, between which are located the boards or panels 18. These parts are attached at their front ends to the cross bar 12 and at other points to the cross bars 19 fixed upon the brackets 14.

To provide for the mounting of my improved brake device on the sled a metal strap 22 is fixed at its front end to the crossbar and extends longitudinally of the sled under the central top bar 17, this strap being bent or curved adjacent its front end in parallelism with the front portions 11 of the runners, as seen in side view, and extends horizontally throughout its main length at a slight elevation above the tops of the said runners, the strap curving upward at its rear end to be attached to the underside of the central bar 17 as at 23.

The skid or braking members comprise a pair of endless chains 25 that encircle the respective runners and are attached to the sled by being passed through notches 25ª into U-shaped brackets 25' secured by nuts 50 on a transverse rod 26 forming the front and base end of a triangular frame whose sides are constituted by the oblique bars 27 that are fixed at their front ends to the said rod and incline rearwardly toward one another. The chains are held in the notches 25ª by means of cap-plates such as 25ᵇ secured to said brackets 25' by screws 25ᶜ. Upon the rod 26 three rollers are mounted, consisting of a centrally positioned roller 28 and two end rollers 29, these rollers being all flanged, the brackets 25' straddling the end rollers 29. The central roller 28 engages the underside of the strap 22, while the end rollers 29 are adapted to run on the flange elements 10' of the runners 10 when the braking device is moving to operative position. The oblique frame members 27 are attached at their rear ends to the ends of a U-shaped strap 32, that straddles the strap 22 from below the latter, and which have a roller 33 supported between their upper ends and resting upon the said strap 22.

Normally the rod 26 is held in the position shown in Fig. 2 of the drawing, with the chains 25 elevated above the surface on which the sled rests, being retained in this position by means of a latch in the form of an angular lever 36 that is pivoted at one end to and upon the strap 22 as at 37 and has its other end projecting through an aperture 38 in the strap 22 and under the roller 28. To this lever a loop 39 is attached and extends upward and around the usual steering bar 40 on the sled. A spring 41 may be fixed to the strap 22 and urge the latch to operative position.

When the braking device is to be applied the loop 39 is pulled, releasing the latch 36 from under the roller 28, and the frame 26, 27 and with it the chains 25, slides downwardly and rearwardly under the influence of gravity until the chains engage under the horizontal portions of the runners, the rearward movement of the braking element being limited by the rollers 29 striking the front ones of the brackets 14.

In the modification shown in Fig. 7, the latch arm is provided with a handle 45 that projects upward through the sled platform and may be engaged with an ordinary ratchet rack 46 on the latter to lock the latch arm in selected positions, so that the drag of the chains may be varied.

Having thus described my invention, what I claim as new and desire to protect by Letters Patent of the United States is as follows:—

1. In combination with a sled having a pair or runners with upwardly curved front ends, a slidable carriage supported by the said upwardly curved front ends of the runners, braking elements depending from said carriage, and releasable means retaining the said carriage engaged with the top portions of the said upwardly curved runner ends.

2. In combination with a sled having a pair of runners with upwardly curved front ends, a slidable carriage supported by the said upwardly curved front ends of the runners, braking elements depending from said carriage, and releasable means retaining the said carriage engaged with the top portions of the said upwardly curved runner ends, said braking elements consisting of chains attached to the said carriage and encircling the respective runners.

3. In combination with the frame of a sled having a pair of runners with upwardly curved front ends, a strap secured to the said frame midways between the sides thereof, and extending longitudinally of the sled in parallelism with the said front ends of the runners, a carriage comprising a triangular frame having a transverse rod element at its front end, said rod having a roller mounted thereon midway between its ends and engaging the underside of said strap, and a pair of rollers on its ends engaging the top faces of the said runners, endless chains attached freely to the said frame and surrounding the said runners, and a releasable latch normally engaging the central one of said rollers to retain the said carriage in position with the end rollers engaged with the top portions of the said upwardly curved runner ends.

4. In combination with the frame of a sled having a pair of runners with upwardly curved front ends, a strap secured to the said frame midways between the sides thereof, and extending longitudinally of the sled in parallelism with the said front ends of the runners, a carriage comprising a triangular frame having a transverse rod element at its front end, said rod having a roller mounted thereon midway between its ends and engaging the underside of said strap, and a pair of rollers on its ends engaging the top faces of the said runners, endless chains attached freely to said frame and surrounding the said runners, and a releasable latch normally engaging the central one of said rollers to retain the said carriage in position with the end rollers engaged with the top portions of the said upwardly curved runner ends, the remainder of said carriage frame being constituted by a pair of obliquely inclined bars, a U-shaped strap to which the said bars are attached at their rear ends, said U-strap straddling the before mentioned longitudinal strap from the bottom upward, and a roller mounted in the said U-strap and resting upon the said longitudinal strap.

5. In combination with a sled having a pair of runners with upwardly curved front ends, a slidable carriage supported by the said upwardly curved front ends of the runners, braking elements depending from said carriage, and releasable means retaining the said carriage engaged with the top portions of the said upwardly curved runner ends, said means comprising a latch arm engaged with said carriage.

6. In combination with the frame of a sled having a pair of runners with upwardly curved front ends, a strap secured to the said frame midways between the sides thereof, and extending longitudinally of the sled in parallelism with the said front ends of the runners, a carriage comprising a triangular frame having a transverse rod element at its front end, said rod having a roller mounted thereon midway between its ends and engaging the underside of said strap, and a pair of rollers on its ends engaging the top faces of the said runners, and a releasable latch normally engaging the central one of said rollers to retain the said carriage in position with the end rollers engaged with the top portions of the said upwardly curved runner ends, U-brackets straddling said rods and end rollers and formed with notches in their top sides, endless chains received in said notches and surrounding said runners.

In testimony whereof I have affixed my signature.

HENRY RUZICKA.